United States Patent

Wilson

[15] 3,640,209
[45] Feb. 8, 1972

[54] PAN HAVING ARTICLE-SUPPORTING WALL ABOVE BOTTOM WALL

[72] Inventor: Calvin L. Wilson, Richmond, Va.
[73] Assignee: Reynolds Metals Company, Richmond, Va.
[22] Filed: July 24, 1969
[21] Appl. No.: 844,442

[52] U.S. Cl. ................................................99/446, 229/3.5
[51] Int. Cl. ................................................A47j 35/00
[58] Field of Search ................99/446, 447, 450, 425, 444; 18/19; 126/25, 39; 220/63, 64, 72; 229/3.5, 14

[56] References Cited

UNITED STATES PATENTS

| | | | |
|---|---|---|---|
| 1,301,197 | 4/1919 | Tully | 126/39 M UX |
| 2,875,683 | 3/1959 | Burns | 99/444 |
| 3,070,899 | 1/1963 | Lappin | 126/39 M UX |
| 3,127,828 | 4/1964 | Fine | 99/446 |
| 3,209,978 | 10/1965 | Dupuis | 229/14 |
| 3,230,864 | 1/1966 | Krajewski | 99/446 |
| 3,292,528 | 12/1966 | Myler | 99/446 |
| 3,453,949 | 7/1969 | Levin | 99/446 |

Primary Examiner—Billy J. Wilhite
Assistant Examiner—Arthur O. Henderson
Attorney—Glenn, Palmer, Lyne, Gibbs & Thompson

[57] ABSTRACT

A disposable pan wherein such pan is particularly adapted for broiling food products and is defined by laminating a layer of metallic foil to a layer of a comparatively inexpensive nonmetallic material. The pan has metallic foil defining practically its entire exposed inside and outside surfaces and has an article-supporting wall arranged above a bottom wall with a space provided therebetween for collecting juice, or the like, exuding from a product contained in the pan.

33 Claims, 16 Drawing Figures

PATENTED FEB 8 1972

INVENTORS
CALVIN L. WILSON

BY Glenn, Palmer, Lyne,
Gibbs & Thompson

THEIR ATTORNEYS

INVENTORS
CALVIN L. WILSON

BY Glenn, Palmer, Lyne, Gibbs & Thompson

THEIR ATTORNEYS

INVENTORS
CALVIN L. WILSON

BY Glenn Palmer, Lyne,
Gibbs & Thompson

THEIR ATTORNEYS

INVENTORS
CALVIN L. WILSON

BY *Glenn, Palmer, Lyne,*
*Gibbs & Thompson*

THEIR ATTORNEYS

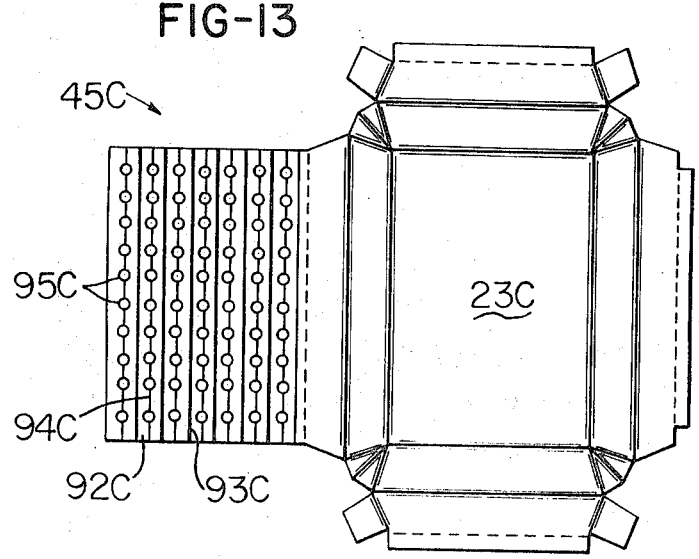
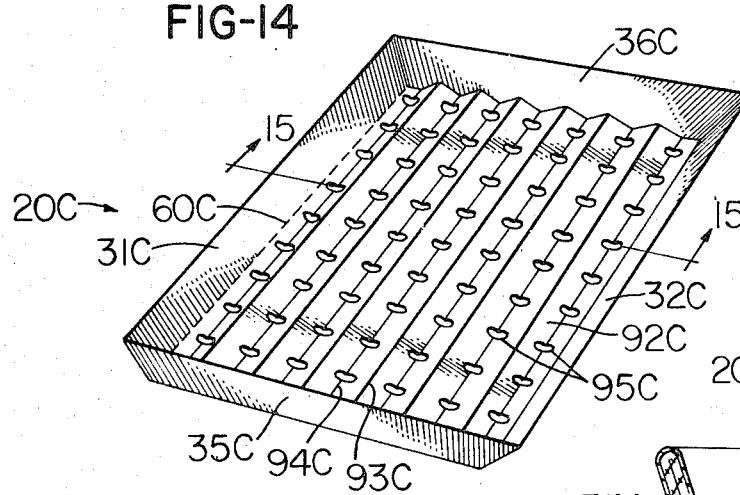
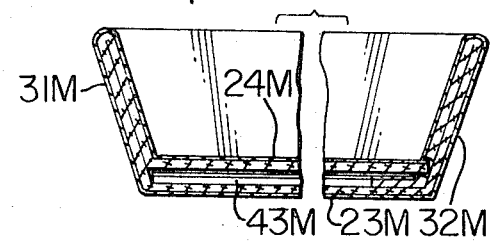
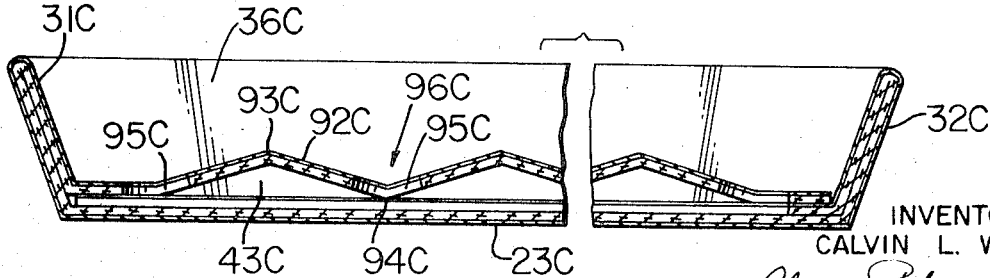

PAN HAVING ARTICLE-SUPPORTING WALL ABOVE BOTTOM WALL

BACKGROUND OF THE INVENTION

There have been many disposable cooking pans, such as broiling pans, for example, proposed heretofore; however, these previously proposed pans generally use comparatively large quantities of metal and are generally preformed which makes them not only very expensive because of the cost of the metal but also unnecessarily bulky to handle and store.

SUMMARY

This invention provides an improved disposable pan, particularly adapted for broiling food products and wherein the pan is made of a laminate defined by a layer of metallic foil and a layer of a comparatively inexpensive nonmetallic material. The pan has metallic foil defining practically its entire exposed inside and outside surfaces and has an article-supporting wall arranged above a bottom wall thereof with space provided therebetween for collecting juice, or the like, exuding from a product contained in the pan.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention, in which

FIG. 13 is a plan view of another exemplary blank which is particularly adapted to be folded to define another exemplary embodiment of a disposable broiling pan;

FIG. 14 is a perspective view illustrating a disposable broiling pan formed upon assembling the blank of FIG. 13;

FIG. 15 is an enlarged fragmentary cross-sectional view taken on the line 15—15 of FIG. 14; and FIG. 16 is a fragmentary cross-sectional view illustrating still another exemplary embodiment of a pan of this invention which has an article-supporting wall which is free of openings, or the like.

DESCRIPTION OF ILLUSTRATED EMBODIMENTS

Figure 1:
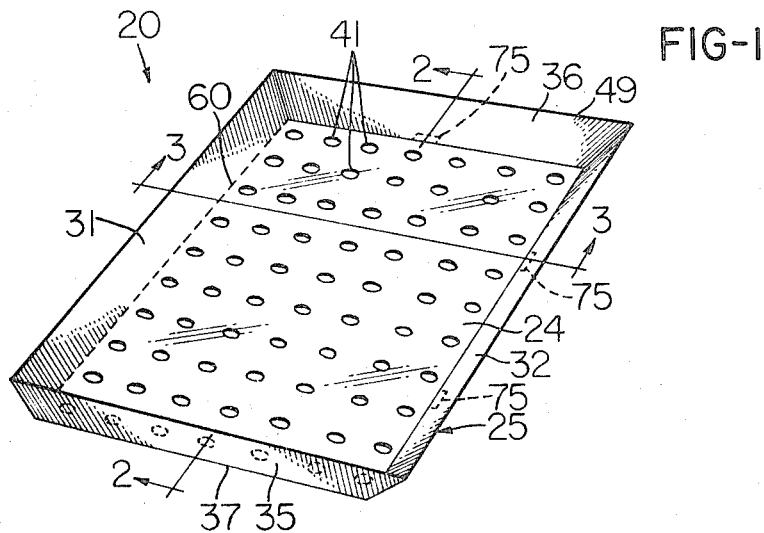
FIG. 1 is a perspective view illustrating one exemplary embodiment of the pan of this invention.

Reference is now made to FIG. 1 of the drawings wherein a cooking pan 20 is illustrated which is particularly adapted for broiling food products and particularly food products such as sausage, bacon, hamburgers, or the like, which exude substantial quantities of liquids such as moisture, fat, and the like, during broiling, and such liquids will be referred to generally as juice or juices. The pan 20 is of simple and economical construction and is made of a laminate defined by a layer of metallic foil 21 and a layer of a comparatively inexpensive nonmetallic structural material such as a fibrous paper layer 22. The paper layer may be of the type which is heat resistant and has high strength when wet or loaded with liquids or juices for reasons which will be apparent later in this specification.

Figure 2:
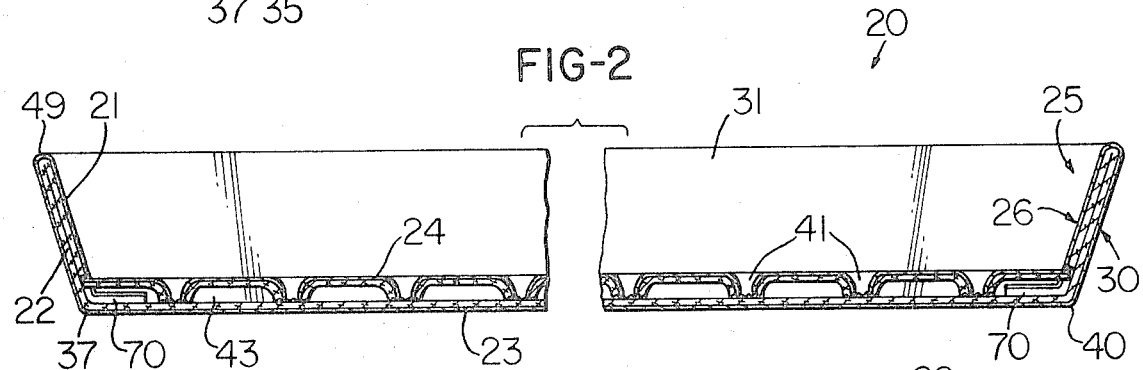
FIG. 2 is an enlarged cross-sectional view with parts broken away taken essentially on the line 2—2 of FIG. 1.
Figure 3:
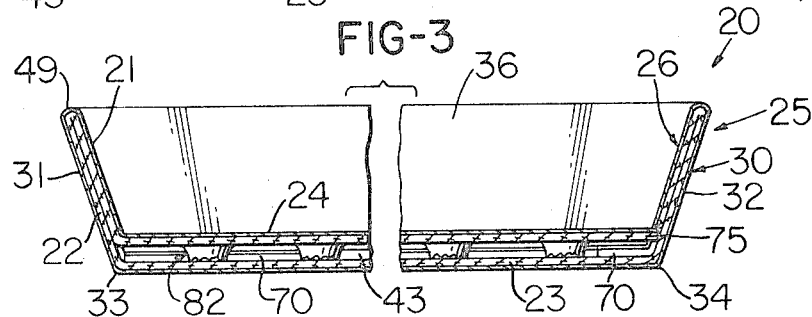
FIG. 3 is an enlarged cross-sectional view with parts broken away taken essentially on the line 3—3 of FIG. 1.

The pan 20 has a bottom wall 23 which has its metallic foil layer 21 defining the outside or exposed surface thereof and an article-supporting wall 24 having its metallic foil layer defining its supporting surface. The pan 20 also has a peripheral wall construction designated generally by the reference numeral 25 which adjoins the peripheral edge of the bottom wall 23 and the peripheral wall construction 25 is defined by two layers of laminated material arranged so that metallic foil 21 defines both the inside and the outside surface of the peripheral wall construction 25 and as illustrated at 26 and 30, in FIGS. 2 and 3, respectively.

Figure 4:
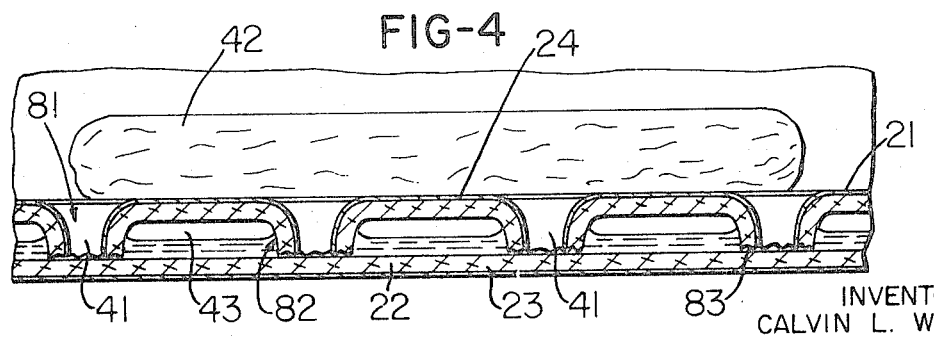
FIG. 4 is a greatly enlarged fragmentary cross-sectional view particularly illustrating a food product which is to be broiled resting on the top surface of an article-supporting wall comprising the pan of FIG. 1.

The peripheral wall construction 25 is comprised of a pair of sidewalls 31 and 32 foldably connected along fold lines 33 and 34 respectively defining opposite side edges of the bottom wall 23 and a pair of end walls 35 and 36 foldably connected along fold lines 37 and 40 respectively defining opposite end edges of the bottom wall 23. The article-supporting wall 24 has a plurality of spaced openings 41 provided therein which allow juice, such as fat, exuding from a food product and shown in FIG. 4 as a piece of sausage 42, to flow into a controlled space 43 defined by spacing the article-supporting wall 24 above the bottom wall 23. The space 43 provides a substantially sheltered reservoir for the fat exuding from the sausage enabling efficient and safe broiling with minimum likelihood of igniting such fat.

As will be readily apparent from FIGS. 1–4 of the drawings, the pan 20 is constructed so that it is only necessary to laminate metallic foil on one side of an inexpensive paper layer 22. The pan is constructed so that practically its entire exposed inside and outside surfaces are defined by metallic foil with the comparatively inexpensive paper layer providing structural strength for the pan. Thus, the paper layer is protected against burning or charring by the metallic foil yet a comparatively strong and inexpensive pan is provided which is very simple to manufacture.

Figure 5:
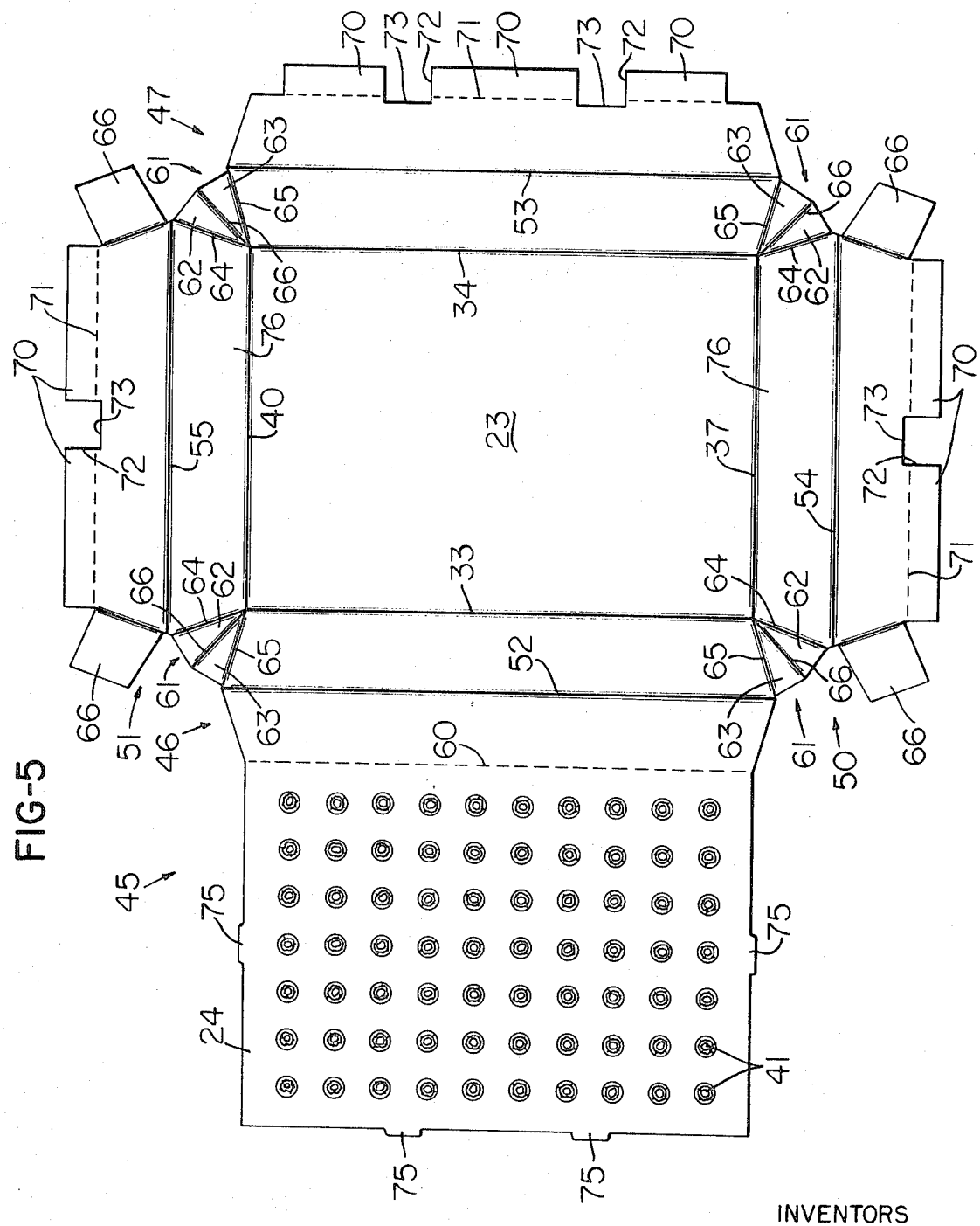
FIG. 5 is a plan view of an exemplary blank used to make the pan of FIG. 1.

The pan 20 may be made in any suitable manner; however, it is preferably made from a single-piece blank 45 illustrated in FIG. 5 of the drawings and the blank 45 is of a two-ply construction defined by paper layer 22 and metallic foil layer 21. The blank 45 is suitably cut and scored so that it may be easily assembled and its various walls are held together in an interlocking manner independent of separate means such as fasteners, adhesive, and the like, and in a manner which will be readily understood from viewing FIGS. 5–9 of the drawings. Further, the blank 45 is positioned with its paper layer facing upwardly, as shown in FIG. 5, making it easy to assemble so that the resulting assembled pan 20 has metallic foil defining its entire inside and outside surfaces. The metallic foil 21 comprising the blank 45 is preferably a metallic foil containing aluminum. Further, such foil may be suitably imprinted, embossed, or kept plain, as desired. It will also be appreciated that the previously described openings 41 may be formed in the blank and such openings are in the form of punched openings for reasons which will be explained in detail subsequently.

The blank 45 has a pair of side flaps 46 and 47 foldably connected to opposite side edges of the bottom wall 23 along the fold lines 33 and 34 respectively and has a pair of end flaps 50 and 51 foldably connected to opposite end edges of the bottom wall 23 along fold lines 37 and 40 respectively. The side flaps 46 and 47 are adapted to be folded substantially in half along fold lines 52 and 53 respectively to define associated sidewalls 31 and 32 of pan 20. Similarly the end flaps 50 and 51 are adapted to be folded substantially in half along fold lines 54 and 55 respectively to define associated end walls 35 and 36 of the resulting pan 20. The folding of flaps 46, 47, 50, and 51 substantially in half defines a top edge 49 of outwardly convex configuration for the entire peripheral wall 25 and the outer surface of such top edge is made of metallic foil 21.

An extension of substantially rectangular configuration is provided extending from one of the flaps and in this example such extension extends beyond a weakened line 60, which may be in the form of a cut-score line, defining the terminal outer end of the flap 46. As seen particularly in FIG. 9, the extension is folded above and parallel to the bottom wall 23 to define the article supporting wall 24 and hence such extension will also be designated by the reference numeral 24.

The blank has a plurality of substantially identical integral gussets each designated generally by the reference numeral 61 and comprised of a pair of adjoining triangular portions 62 and 63. Each integral gusset is foldably connected between the lower edge portions of each associated end flap and each associated side flap along typical fold lines as indicated at 64 and 65 respectively. Each gusset 61 is particularly adapted to be bifolded along a fold line 66 and the fold line 66 defines a common side for the triangular portions 62 and 63.

Each end flap 50 and 51 has a pair of holding flaps 66 extending from opposite ends thereof and each flap 47, 50, and 51 has a plurality of tabs 70 extending beyond an associated interrupted weakened line 71 defining the terminal outer edge of each flap 47, 50, and 51 respectively. Each flap 47, 50, and 51 also has at least one rectangular cutout 72 provided therein and each cutout 72 extends inwardly in its associated flap and has a base portion 73 which is arranged parallel to its associated weakened line 71 and inwardly thereof.

The extension 24 extending outwardly of flap 46 also has a plurality of locking tabs 75 and upon folding the blank 45 to define the resulting pan 20 each locking tab 75 is received within an associated cutout 72 with the top surface of each locking tab 75 held beneath an associated base portion or inner edge 73. Thus, once the blank 45 is assembled in the manner illustrated in FIGS. 6-9 of the drawings the resulting pan 20 is held together in a high-strength manner without requiring separate or independent fastening means.

Figure 6:
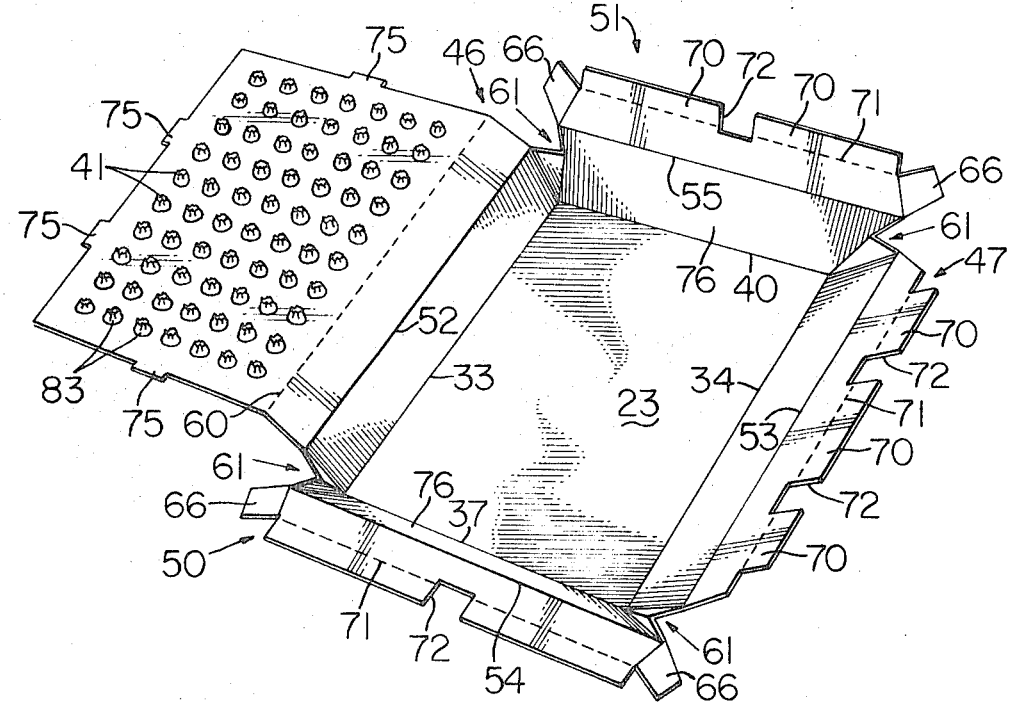
FIGS. 6–9 illustrate a series of exemplary steps used to fold the blank of FIG. 5 to define the pan of FIG. 1 which has its walls suitably held together in an interlocked manner without requiring separate or independent fastening means.

The blank 45 is assembled with simplicity by bifolding each gusset 61 along its associated fold line 66 and arranging each gusset substantially coplanar with the lower half 76 of an associated end flap, see FIG. 6.

Figure 7:
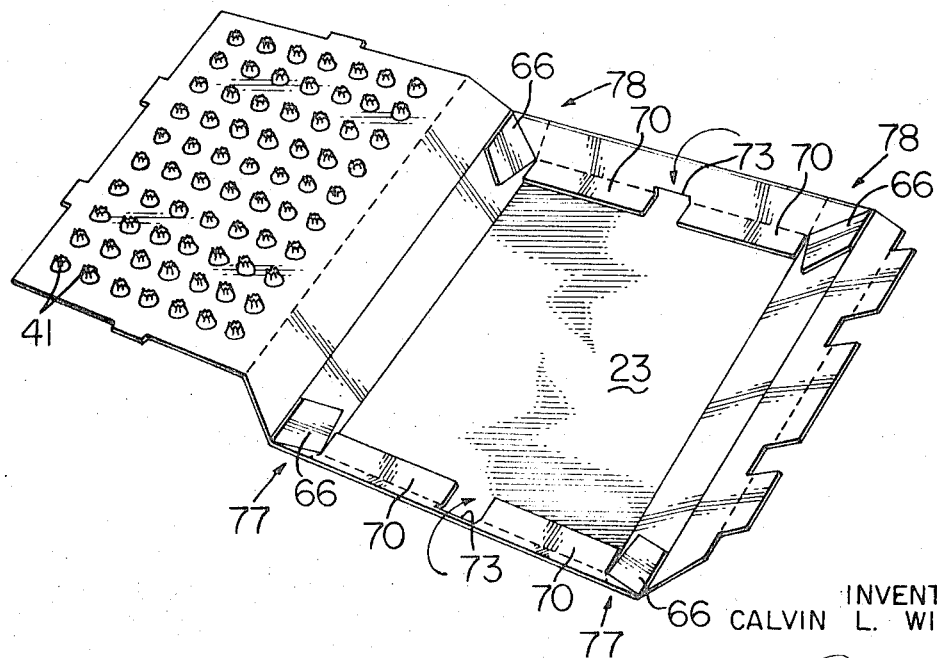
Figure 8:
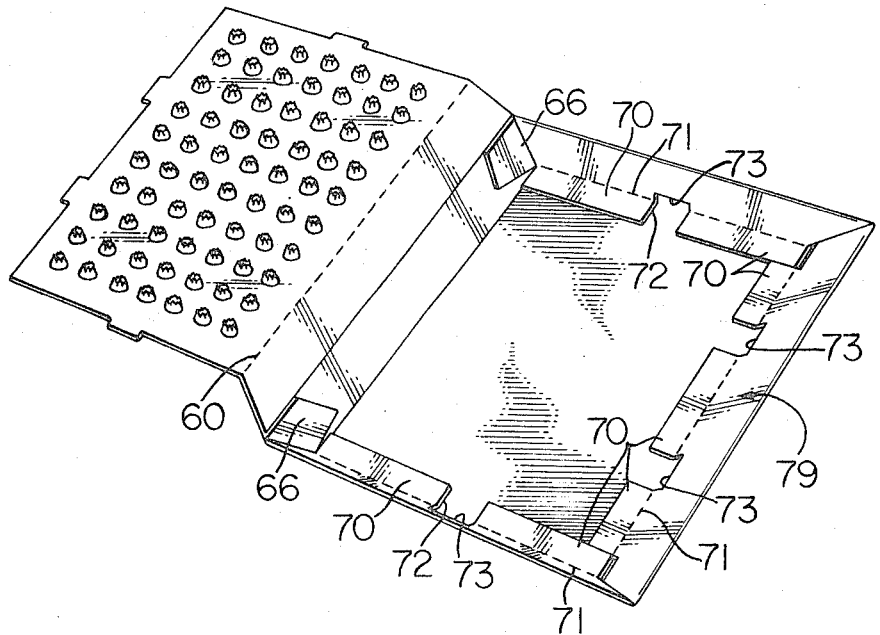
Figure 9:
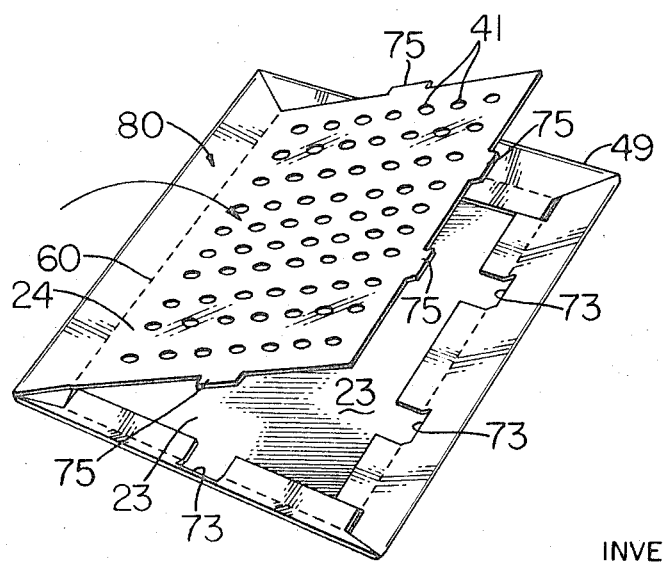

The outer half of each end flap 50 and 51 is then folded against its associated bifolded gussets 61 as indicated at 77 and 78 respectively in FIG. 7 and each holding flap 66 is arranged substantially coplanar with the lower or inner half of an associated sidewall flap, either 46 or 47. The outer half of flap 47 is folded in position against its associated pair of holding flaps 66 as illustrated at 79 in FIG. 8, and the outer half of flap 46 is then folded in position against its associated pair of holding flaps 66 as illustrated at 80 in FIG. 9, whereupon the outer halves of flaps 46, 47, 50, and 51 are then held in position by the extension or article-supporting wall 24 of pan 20 which is foldably connected to the outer half of flap 46 along weakened line 60. It will also be noted from FIGS. 7-9 of the drawings that the tabs 70 extending from flaps 47, 50, and 51 are folded substantially coplanar with bottom wall 23 and upon folding extension 24 in position the looking tabs 75 lock beneath edges 73 to hold the blank 45 together in an interlocked high-strength manner.

From the above description it will be appreciated that the blank 45 may be shipped and stored in its flat form and then simply and easily erected in a manner illustrated in FIGS. 6-9 of the drawings whereby the broiling pan 20 defined from blank 45 has not only the advantage of being made from comparatively inexpensive materials but also has the added advantage of being capable of being erected from a flattened form without requiring separate fastening means. However, it will be appreciated that, if desired, separate fastening means may be used to fasten the associated flaps in position to define the broiling pan 20.

The openings 41 provided in the extension 24 and hence in the article-supporting wall 24 of pan 20 are in the form of punched openings which are punched using any suitable tool so that the punching action is provided in a direction generally from the foil layer 21 toward the paper layer 22. The punching action causes the upper portion of each opening 41 to be lined with metallic foil and be provided with an arcuate configuration as seen at 81 in FIG. 4 for a typical opening 41. The punching action also defines a substantially tubular column 82 of roughly two-ply construction around each opening 41 and each column 82 defines integral means spacing the article-supporting wall 24 above the bottom wall 23 to define the previously mentioned controlled space 43 therebetween.

The punching action also causes the columns 82 to have jagged lower edges of paper as indicated at 83 and the jagged lower edges in essence provide a wicking action which helps absorb juice exuding from a food product, such as sausage 42, during broiling thereof, for example. As previously mentioned, the paper layer 22 is preferably of a type which has high strength even when saturated with moisture, juice, etc., whereby the disposable broiling pan 20 retains its structural strength and rigidity and assures trouble-free broiling.

Thus, it is seen that the punched openings 41 define columns 82 which in essence define spacing means which space and support the article-supporting wall 24 above the bottom wall 23. Further, the punching action provides a smooth inlet into each opening 41 which is effectively lined with metallic foil so as to shield the paper layer 22 against burning or charring, and also forms jagged edges 83 which provide a wicking or absorbing action for juices, and the like, exuding from a product contained or being cooked in the pan 20.

Figure 10:
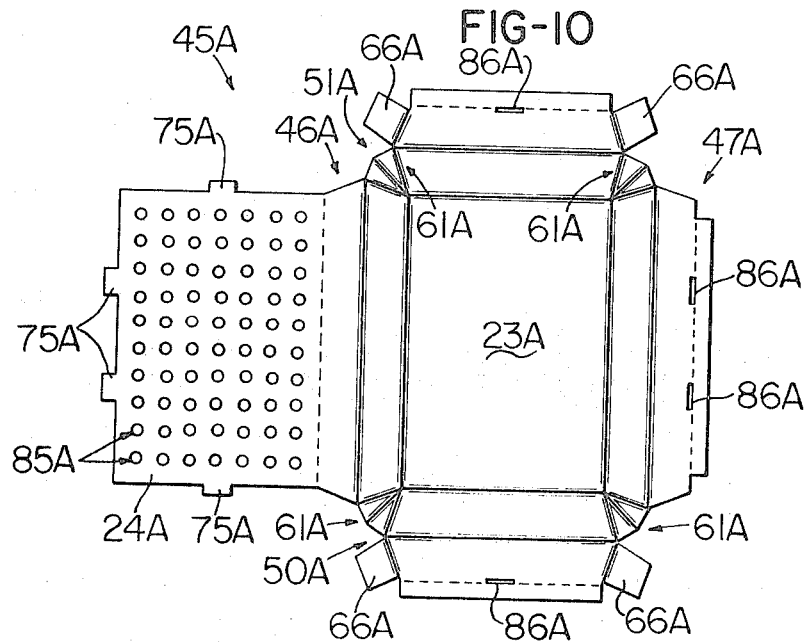
FIG. 10 is a plan view of another exemplary blank similar to the blank of FIG. 5 which is adapted to be assembled to define another exemplary embodiment of a disposable broiling pan.
Figure 11:
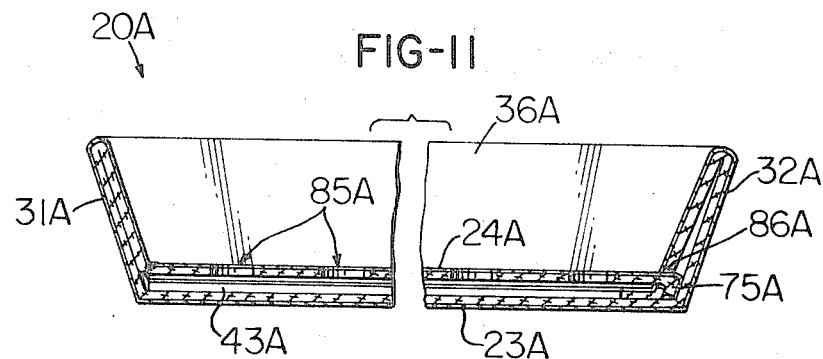
FIG. 11 is a fragmentary cross-sectional view similar to FIG. 3 and illustrating a pan made from the blank of FIG. 10.

Another exemplary embodiment of this invention is illustrated in FIGS. 10 and 11 of the drawings which illustrate respectively a blank and a resulting pan made from such blank. The blank and pan illustrated in FIGS. 10 and 11 are very similar to the blank 45 and pan 20; therefore, such blank and pan will be designated generally by the reference numerals 45A and 20A respectively and parts thereof which are very similar to corresponding parts of the blank 45 and the pan 20 will be designated by the same numeral as in the blank 45 and pan 20 also followed by the letter designation "A" and not described again. Only those component parts which are substantially different from corresponding parts of the blank 45 and pan 20 will be designated by new reference numerals also followed by the letter designation A and described in detail.

The main difference between the blank 45A and the blank 45 is that the blank 45A has openings in its extension 24A which are not punched but severed clear through in a clean manner and as illustrated at 85A in FIG. 11. In addition, it will be noted that the cutouts provided in each flap 47A, 50A, and 51A are in the form of cutout openings of rectangular outline and each is designated by the reference numeral 86A. In the assembled pan 20A each locking tab 75A extending from extension 24A is received within an associated cutout 86A and serves to space such extension or article-supporting wall 24A above the bottom wall 23A to define the controlled space 43A therebetween.

Figure 12:
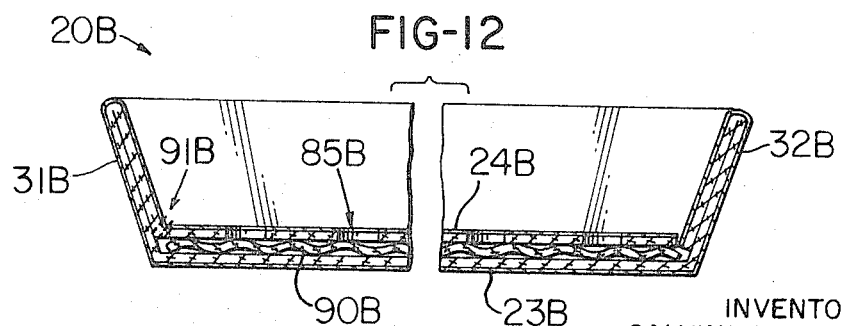
FIG. 12 is a fragmentary cross-sectional view similar to FIG. 3 and illustrating another exemplary embodiment of a broiling pan of this invention having separate spacing means provided between its bottom wall and its article-supporting wall.

Reference is now made to FIG. 12 of the drawings which illustrates another exemplary embodiment of a pan which is similar to the pan 20A and is designated generally by the reference numeral 20B. The pan 20B may be formed from a blank substantially identical to the blank 45A with the exception that the tabs 75A and cutouts 86A may be eliminated; therefore, the pan 20B has separate spacing means in the form of a separate spacer 90B of undulating configuration arranged between bottom wall 23B and article-supporting wall 24B. The spacer 90B may be made of a heat resistant material and also have absorbing qualities so that it will readily absorb juice exuding from an associated product contained in the pan 20B.

It will also be appreciated that the article-supporting wall 24B may be provided in the pan 20B as a separate member and in this latter instance it would be free or detached from flap 46, as indicated by dotted lines at 91B in FIG. 12, as well as being detached from the remaining walls of pan 20B. Upon using spacer 90B with a separate or detached article-supporting wall such spacer provides the sole support for the article-supporting wall 24B as well as the required spacing function.

Another exemplary embodiment of this invention is illustrated in FIGS. 13–15 of the drawings. The blank and resulting pan illustrated in FIGS. 13–15 are very similar to the blank 45 and pan 20; therefore, such blank and pan will be designated generally by the reference numerals 45C and 20C respectively and parts of the blank 45C and pan 20C which are very similar to corresponding parts of the blank 45 and pan 20 respectively will be designated by the same reference numerals as previously also followed by the letter designation "C" and not described again. As previously, only those component parts which are different from corresponding parts of the blank 45 and pan 20 will be designated by a new reference numeral also followed by the letter designation C and described in detail.

The blank 45C has an extension 92C which defines an article-supporting wall in the assembled pan 20C which is also designated by the reference numeral 92C and extension 92C has an undulating or roughly sinusoidal configuration which is characterized by sharp upper and lower ridges as indicated at 93C and 94C respectively in FIG. 15. Blank 45C also has openings 95C which are cut clear through the foil layer 21 and the paper layer 22 and the openings are provided so that the article-supporting wall 92C has the openings provided in the bottom portion of each downwardly extending wave or ridge 94C and as indicated at 96C. The openings 95C allow juice from a product contained in pan 20C to flow in the space 43C.

The undulating configuration of the article-supporting wall 92C provides added strength and rigidity for such wall in a manner which is well known in the art. In addition, it will be appreciated that such undulating configuration in essence defines integral spacing means for wall 92C and hence controlled space 43C between the article-supporting wall 92C and the bottom wall 23C. The undulating configuration and openings 95C may be formed in extension 92C of blank 45C using known techniques and with the remainder of the blank kept in its flat form; further, the height and shape of the ridges may be changed as desired.

It will also be appreciated in connection with the blank 45C and the resulting pan 20C that it is not necessary to provide tabs extending from extension 92C which are similar to the tabs 75 of extension 24 in blank 45. Further, it is not necessary to provide cutouts corresponding to cutouts 72 of the blank 45.

A modification of the pan 20 is illustrated in FIG. 16 of the drawings and designated by the reference numeral 20M. The pan illustrated in FIG. 16 is substantially identical to the pan 20 and hence will be designated generally by the reference numeral 20M. The main difference between the pan 20M and the pan 20 is that the pan 20M is not provided with openings in its article-supporting wall 24M. In those instances where it is desired to use the pan 20M as a broiling pan it is a simple matter to provide the length of the article-supporting wall in the direction parallel to its sidewalls 31M and 32M so that it is shorter than such sidewalls whereupon juice may flow around the ends of article-supporting wall 24M into the space 43M beneath such article-supporting wall.

The pan 20M may be used as a baking pan or for other suitable purposes where it is not desired to provide openings in the article-supporting wall 24M; yet, it will be appreciated that pan 20M is of simple and economical construction, is made from a single piece blank, and utilizes a minimum amount of metallic foil bonded to a comparatively inexpensive layer of paper to provide the required strength and rigidity for such pan.

If desired, each pan 20, 20C, and 20M may also have its associated article-supporting wall provided either as an integral part of its associated walls or as a separate member and as described in connection with wall 24B of the pan 20B. However, it is to be understood that it is preferred that each pan of this invention be made from a single piece of foldable material which is assembled and interlocked without separate fastening means although the single piece of foldable material or blank may be held together by separate means.

The various exemplary pans presented in this specification have been described as being broiling pans; however, it is to be understood that such pans may be used for all types of cooking, and the like, where a disposable pan would be desirable. Also, each pan may be used as a container within which a product may be sold and its unique features assure that juices exuding from such product during storage and display are isolated from the product.

While present exemplary embodiments of this invention, and methods of practicing the same, have been illustrated and described, it will be recognized that this invention may be otherwise variously embodied and practiced by those skilled in the art.

What is claimed is:

1. A pan made of a laminate defined by a layer of metallic foil and a layer of a comparatively inexpensive nonmetallic structural material, said pan comprising, a bottom wall having its metallic foil layer defining the outside surface thereof, an article-supporting wall supported above said bottom wall and having its metallic foil layer defining its supporting surface, said bottom wall and article-supporting wall having their layers of nonmetallic material arranged immediately adjacent each other while providing a double thickness of said nonmetallic material, and a peripheral wall construction adjoining the peripheral edge of said bottom wall and being defined by two foldably interconnected layers of said laminate arranged so that metallic foil defines both the inside and outside surface of said peripheral wall construction, said peripheral wall construction comprising a double thickness of said nonmetallic material, said pan having metallic foil defining practically its entire exposed inside and outside surfaces with said nonmetallic structural material providing structural strength therefor making said pan particularly suitable for use as a disposable high-strength cooking pan.

2. A pan as set forth in claim 1 in which said article-supporting wall is provided as a separate member.

3. A pan as set forth in claim 1 in which said article-supporting wall comprises an extension extending outwardly from a lower portion of said peripheral wall and being foldably connected thereto.

4. A pan as set forth in claim 3 and further comprising integral means in said article-supporting wall spacing it above said bottom wall.

5. A pan as set forth in claim 1 in which said nonmetallic material comprises a moisture-absorbing fibrous material having high-strength when wet.

6. A pan as set forth in claim 1 in which said peripheral wall comprises a pair of sidewalls foldably connected to opposite side edges of said bottom wall and a pair of end walls foldably connected to opposite end edges of said bottom wall.

7. A pan made of a laminate defined by a layer of metallic foil and a layer of a comparatively inexpensive nonmetallic structural material, said pan comprising, a bottom wall having its metallic foil layer defining the outside surface thereof, an article-supporting wall supported above said bottom wall and having its metallic foil layer defining its supporting surface, and a peripheral wall construction comprising a pair of sidewalls foldably connected to opposite side edges of said bottom wall and a pair of end walls foldably connected to opposite end edges of said bottom wall, said peripheral wall construction being defined by two layers of said laminate arranged so that metallic foil defines both the inside and outside surface of said peripheral wall construction, each of said end and sidewalls being defined by an integral flap extending from said bottom wall with each flap being folded substantially in half to define said two layers of laminated material and having an integral outwardly convex top edge made of metallic foil, said pan having metallic foil defining practically its entire exposed inside and outside surfaces with said inexpensive nonmetallic structural material providing structural strength therefor making said pan particularly suitable for use as a disposable high-strength cooking pan.

8. A pan as set forth in claim 1 and further comprising means spacing said article-supporting wall above said bottom wall.

9. A pan as set forth in claim 8 and further comprising a plurality of spaced openings in said article-supporting wall allowing juice from an associated product supported on said article-supporting wall to drain between said bottom wall and article-supporting wall into a controlled space defined by said spacing means.

10. A pan as set forth in claim 9 in which said spacing means comprises a separate member.

11. A pan as set forth in claim 10 in which said separate member comprises a sheet having an undulating cross-sectional configuration.

12. A pan made of a laminate defined by a layer of metallic foil and a layer of a comparatively inexpensive nonmetallic structural material, said pan comprising, a bottom wall having its metallic foil layer defining the outside surface thereof, an article-supporting wall supported above said bottom wall and having its metallic foil layer defining its supporting surface, and a peripheral wall construction adjoining the peripheral edge of said bottom wall and being defined by two layers of said laminate arranged so that metallic foil defines both the inside and outside surface of said peripheral wall construction, said peripheral wall construction comprising a pair of sidewalls foldably connected to opposite side edges of said bottom wall and a pair of end walls foldably connected to opposite end edges of said bottom wall, each of said end and sidewalls being defined by an integral flap extending from said bottom wall with each flap being folded substantially in half to define its associated wall and said article-supporting wall comprises an extension extending from one of said flaps, said pan having metallic foil defining practically its entire exposed inside and outside surfaces with said inexpensive nonmetallic structural material providing structural strength therefor making said pan particularly suitable for use as a disposable high-strength cooking pan.

13. A pan as set forth in claim 12 in which said article-supporting wall has a plurality of spaced openings formed therein which are particularly adapted to allow juice from an associated product supported by said article-supporting wall to drain between said bottom wall and said article-supporting wall.

14. A pan as set forth in claim 13 in which said article-supporting wall has integral means spacing it from said bottom wall.

15. A disposable broiling pan made of a laminate defined by a layer of metallic foil and a layer of a comparatively inexpensive structural material, said pan comprising, a bottom wall, a pair of side flaps foldably connected to opposite side edges of said bottom wall, a pair of end flaps foldably connected to opposite end edges of said bottom wall, each side flap and end flap being folded substantially in half to define an associated sidewall and end wall respectively, an extension extending from one of said flaps and being folded above and parallel to said bottom wall to define an article-supporting wall, and a plurality of openings in said article-supporting wall which are particularly adapted to allow juice from an article placed in said pan to flow between said article-supporting wall and said bottom wall, said pan having substantially its entire exposed surface made of metallic foil which protects the inexpensive structural material from burning during broiling.

16. A broiling pan as set forth in claim 15 in which said layer of metallic foil comprises a layer of metallic foil containing aluminum and said layer of comparatively inexpensive material comprises a layer of paper.

17. A broiling pan as set forth in claim 16 in which said paper layer has high strength when wet and inside portions of said bottom wall and article-supporting wall made of said paper serve to absorb said juice.

18. A broiling pan as set forth in claim 16 and further comprising means spacing said article-supporting wall above said bottom wall to define a substantially controlled space therebetween.

19. A broiling pan as set forth in claim 18 in which said spacing means comprises at least one tab extending from a terminal edge portion of said article-supporting wall and engaging an associated wall of said pan to provide said controlled spacing.

20. A broiling pan as set forth in claim 18 in which said spacing means comprises a separate spacer arranged between said article-supporting wall and said bottom wall.

21. A broiling pan as set forth in claim 15 in which said layer of comparatively inexpensive material comprises a layer of paper, said openings are punched openings having upper edges thereof substantially lined by metallic foil which protects the adjoining paper against burning, and said openings being bounded by roughly tubular columns formed by punching and defining integral means spacing said article-supporting wall above said bottom wall to define a substantially controlled space therebetween.

22. A broiling pan as set forth in claim 21 in which said columns have jagged lower paper edges defined by punching which provide a wicking action which helps to absorb said juice.

23. A broiling pan as set forth in claim 15 in which said article-supporting wall has an undulating configuration and said openings are provided in the bottom portion of each downwardly extending wave of said undulating configuration, said undulating article-supporting wall having increased strength and rigidity and said openings assuring juice flows in the space above said bottom wall.

24. A broiling pan as set forth in claim 15 and further comprising, an integral gusset foldably connected between the inner edge portion of each end flap and each side flap, a pair of holding flaps extending from opposite outer ends of the end flaps, each gusset being bifolded and arranged substantially coplanar with the inner half of an associated end flap, with the outer half of each end flap being arranged against an associated pair of bifolded gussets, each holding flap being arranged substantially coplanar with the inner half of an associated side flap and the outer half of each side flap being arranged against an associated pair of holding flaps, and said outer halves being held in position by said article-supporting wall, whereby said pan is held together in an interlocked manner independent of external means.

25. A pan as set forth in claim 24 and further comprising at least one tab extending from each flap other than said one flap, said tabs being arranged substantially coplanar with said bottom wall with said article-supporting wall supported thereagainst.

26. A disposable broiling pan comprising, a bottom wall, a peripheral wall adjoining the peripheral edge of said bottom wall, and an article-supporting wall supported by said bottom wall, said article-supporting wall having a top layer made of metallic foil and a bottom layer made of a comparatively inexpensive material, said article-supporting wall having a plurality of openings therein which are particularly adapted to allow juice from an article placed in said pan to flow between said article-supporting wall and said bottom wall, said openings having upper portions thereof substantially lined by metallic foil which protects the adjoining comparatively inexpensive material against burning, and each of said openings being bounded by integral means comprising said article-supporting wall, said integral means spacing said article-supporting wall above said bottom wall to define a substantially controlled space therebetween, said top layer serving to protect the inexpensive structural material from burning during broiling.

27. A broiling pan as set forth in claim 26 in which said layer of metallic foil comprises a layer of metallic foil containing aluminum and said layer of comparatively inexpensive material comprises a layer of paper having high strength when wet and serving to rapidly absorb said juice.

28. A disposable broiling pan comprising, a bottom wall, a peripheral wall adjoining the peripheral edge of said bottom wall, and an article-supporting wall supported by said bottom wall, said article-supporting wall having a top layer made of metallic foil and a bottom structural layer made of a comparatively inexpensive material comprising a layer of paper, said article-supporting wall having a plurality of openings therein which are particularly adapted to allow juice from an article placed in said pan to flow between said article-supporting wall and said bottom wall, said openings having upper portions thereof substantially lined by metallic foil which protects the adjoining paper against burning and said openings being bounded by inwardly arranged portions of said paper which define integral means spacing said article-supporting wall above said bottom wall to define a substantially controlled space therebetween, said top layer serving to protect the inexpensive structural material from burning during broiling.

29. A broiling pan as set forth in claim 28 in which said openings have jagged lower paper edges which provide a wicking action which helps to absorb said juice.

30. A broiling pan as set forth in claim 26 in which said article-supporting wall is held in position solely by gravity and thus is unattached to said bottom wall and peripheral wall, said layer of comparatively inexpensive material comprises a layer of paper having high strength when wet and serving to rapidly absorb said juice.

31. A disposable broiling pan comprising, a bottom wall, a peripheral wall adjoining the peripheral edge of said bottom wall, and an article-supporting wall supported by said bottom wall, said article-supporting wall having a top layer made of metallic foil and a bottom structural layer made of a comparatively inexpensive material comprising a layer of paper, said article-supporting wall having a plurality of openings therein which are particularly adapted to allow juice from an article placed in said pan to flow between said article-supporting wall and said bottom wall, said openings being punched openings having upper edges thereof substantially lined by metallic foil which protects the adjoining paper against burning and said openings being bounded by roughly tubular columns formed by punching and defining integral means spacing said article-supporting wall above said bottom wall to define a substantially controlled space therebetween, said punching also serving to hold said metallic foil layer and said paper layer tightly together at each punched opening, said top layer serving to protect the inexpensive structural material from burning during broiling.

32. A broiling pan as set forth in claim 26 in which said layer of comparatively inexpensive material comprises paper, said openings are punched openings and said integral means comprise integral roughly tubular columns formed by punching.

33. A broiling pan as set forth in claim 32 in which said columns have jagged lower paper edges defined by said punching which provide a wicking action which helps to absorb said juice.

* * * * *